US012603102B2

(12) United States Patent
Yae

(10) Patent No.: US 12,603,102 B2
(45) Date of Patent: Apr. 14, 2026

(54) SPEECH RECOGNITION SYSTEM AND A METHOD FOR PROVIDING A SPEECH RECOGNITION SERVICE

(71) Applicants: HYUNDAI MOTOR COMPANY, Seoul (KR); KIA CORPORATION, Seoul (KR)

(72) Inventor: Seong Soo Yae, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 424 days.

(21) Appl. No.: 18/076,207

(22) Filed: Dec. 6, 2022

(65) Prior Publication Data

US 2023/0238020 A1 Jul. 27, 2023

(30) Foreign Application Priority Data

Jan. 21, 2022 (KR) ........................ 10-2022-0009548

(51) Int. Cl.
*G10L 25/84* (2013.01)
*G06F 3/01* (2006.01)
(52) U.S. Cl.
CPC ................ *G10L 25/84* (2013.01); *G06F 3/01* (2013.01)
(58) Field of Classification Search
CPC ................. G10L 25/84; G10L 15/1822; G10L 2015/223; G10L 15/22; G10L 17/26; G10L 21/0208; G06F 3/01; G06F 3/017; G06F 3/167; H04R 1/406
See application file for complete search history.

(56) References Cited

U.S. PATENT DOCUMENTS

| | | | | |
|---|---|---|---|---|
| 2006/0259205 A1* | 11/2006 | Krum | ...................... | G06F 3/011 |
| | | | | 701/1 |
| 2021/0221228 A1* | 7/2021 | Barry | ..................... | B60K 35/80 |
| 2022/0171465 A1* | 6/2022 | Luo | ......................... | G06F 3/017 |
| 2023/0049441 A1* | 2/2023 | Yuan | ................... | G08B 21/043 |

FOREIGN PATENT DOCUMENTS

WO WO-2023103072 A1 * 6/2023 ........... B60R 16/037

* cited by examiner

*Primary Examiner* — Bhavesh M Mehta
(74) *Attorney, Agent, or Firm* — Lempia Summerfield Katz LLC

(57) ABSTRACT

Provided are a speech recognition system and a method for providing a speech recognition service that may map and register a tap signal, generated by tapping an object around a user of a vehicle, to a specific command, and replace an utterance for the specific command with a simple action of tapping the nearby object, to improve a user convenience. A speech recognition system includes: a speech processing module configured to extract information from a voice signal of the user in a vehicle; a control module configured to generate a control signal for performing the control intended by the user; and a memory configured to map and store a tap signal and a command corresponding to the tap signal, wherein, when the tap signal is included in an audio signal input, the control module is configured to generate the control signal based on the command corresponding to the stored tap signal.

14 Claims, 15 Drawing Sheets

| | CHARACTERISTIC COMPONENT | C2 = 1 | C2 = 2 | C2 = 3 | C2 = n |
|---|---|---|---|---|---|
| 1 | ⌇ | YES | NO | UNREGISTERED | UNREGISTERED |
| 2 | ⌇ | ROUTE GUIDANCE TO HOME | ROUTE GUIDANCE TO WORK | UNREGISTERED | UNREGISTERED |
| 3 | ⌇ | 101.3 FM ON | UNREGISTERED | UNREGISTERED | UNREGISTERED |
| ... | ... | ... | ... | ... | |

| SELECT COMMAND TO REGISTER | |
| --- | --- |
| 1 | WINDOW CONTROL |
| 2 | SEAT CONTROL |
| 3 | LIGHTING CONTROL |
| 4 | NAVIGATION CONTROL |
| | MORE |

230

SPEECH RECOGNITION SYSTEM AND A METHOD FOR PROVIDING A SPEECH RECOGNITION SERVICE

CROSS-REFERENCE TO RELATED APPLICATION

This application is based on and claims priority under 35 U.S.C. § 119 to Korean Patent Application No. 10-2022-0009548, filed on Jan. 21, 2022 in the Korean Intellectual Property Office, the present disclosure of which is incorporated herein by reference.

BACKGROUND

1. Technical Field

The present disclosure relates to a speech recognition system and a method for providing a speech recognition service that may provide a service corresponding to a user's speech.

2. Description of the Related Art

A speech recognition system is capable of identifying what is intended by a user from a user's speech and providing a service corresponding to the identified user intention.

A speech recognition system is linked to a specific device to control the device and provide specific information according to a user intention.

Recently, because a speech recognition system is provided in a vehicle, a user may control the vehicle, obtain desired information, or be provided with desired services simply by user's utterance or through dialogues with the vehicle.

In order to provide a service desired by a user using the speech recognition system, several dialogues are required to confirm a user's speech and a service corresponding thereto and obtain additional information required to perform the service.

SUMMARY

An aspect of the disclosure provides a speech recognition system and a method for providing a speech recognition service that may map and register a tap signal, generated by tapping an object around a user of a vehicle, to a specific command, and that may replace an utterance for the specific command with a simple action of tapping the nearby object, thereby improving user convenience.

Additional aspects of the disclosure, in part, are set forth in the following description and, in part, should be apparent from the description. Alternatively, additional aspects of the disclosure may be learned by practice of the disclosure.

According to an embodiment of the disclosure, a speech recognition system is provided. The speech recognition system includes: a speech processing module configured to extract information, required to perform a control intended by a user, from a voice signal of the user in a vehicle; a control module configured to generate a control signal for performing the control intended by the user; and a memory configured to map and store a tap signal and a command corresponding to the tap signal. When the tap signal stored in the memory is included in an audio signal input through a microphone, the control module is configured to generate the control signal based on the command corresponding to the stored tap signal.

The tap signal is generated by tapping a nearby object including a constituent component of the vehicle that the user drives or a body part of the user.

The tap signal is defined by a characteristic component of the tap signal and a number of characteristic components included in the tap signal.

The characteristic component of the tap signal varies depending on a type of a nearby object tapped by the user, and the number of characteristic components of the tap signal vary depending on a number of times the user taps the nearby object.

The constituent component of the vehicle includes at least one of a steering wheel, an interior door handle, a shift lever, or an armrest.

The control module is configured to map and store a tap signal input through the microphone to a command selected by the user in the memory, in a registration mode where the tap signal is stored in the memory.

The control module is configured to generate guide information in the registration mode so that numbers different from a number of characteristic components of the tap signal stored in the memory are registered when a characteristic component of the tap signal input through the microphone is identical to a characteristic component of the tap signal stored in the memory.

The control module is configured to generate guide information in the registration mode so that the user inputs another tap signal when the characteristic component of the tap signal input through the microphone is identical to the characteristic component of the tap signal stored in the memory and when tap signals from a tap signal including a single number of the characteristic component to a tap signal including an N (N is an integer greater than or equal to 2 and represents a threshold number) number of the characteristic components are stored in the memory.

The control module is configured to register in the registration mode a smallest number among the numbers different from the number of characteristic components of the tap signal stored in the memory when the characteristic component of the tap signal input through the microphone is identical to the characteristic component of the tap signal stored in the memory.

The microphone includes a driver's side microphone and a passenger side microphone. The control module is configured to remove a noise of an audio signal input through the driver's side microphone, based on an audio signal input through the passenger side microphone.

According to an embodiment of the disclosure, a method of providing a speech recognition service is provided. The method includes: receiving an audio signal input through a microphone located in a vehicle; determining whether a tap signal or a voice signal is included in the audio signal; when the tap signal is included in the audio signal, determining a command mapped to the tap signal; and generating a control signal for performing a control corresponding to the command mapped to the tap signal.

The tap signal is generated by tapping a nearby object including a constituent component of the vehicle that a user drives or a body part of the user.

The tap signal is defined by a characteristic component of the tap signal and a number of characteristic components included in the tap signal.

The characteristic component of the tap signal varies depending on a type of a nearby object tapped by a user. The number of characteristic components of the tap signal vary depending on a number of times the user taps the nearby object.

The constituent component of the vehicle includes at least one of a steering wheel, an interior door handle, a shift lever, or an armrest.

The method further includes mapping and storing a tap signal input through the microphone to a command selected by a user in a memory, in a registration mode where the tap signal is stored in the memory.

The storing in the memory includes generating guide information in the registration mode so that numbers different from a number of characteristic components of the tap signal stored in the memory are registered when a characteristic component of the tap signal input through the microphone is identical to a characteristic component of the tap signal stored in the memory.

The storing in the memory further includes generating guide information in the registration mode so that the user inputs another tap signal when the characteristic component of the tap signal input through the microphone is identical to the characteristic component of the tap signal stored in the memory, and when tap signals from a tap signal including a single number of the characteristic component to a tap signal including an N (N is an integer greater than or equal to 2 and represents a threshold number) number of the characteristic components are stored in the memory.

The storing in the memory further includes registering in the registration mode a smallest number among the numbers different from the number of characteristic components of the tap signal stored in the memory when the characteristic component of the tap signal input through the microphone is identical to the characteristic component of the tap signal stored in the memory.

The microphone includes a driver's side microphone and a passenger side microphone, and the method further includes removing a noise of an audio signal input through the driver's side microphone, based on an audio signal input through the passenger side microphone.

BRIEF DESCRIPTION OF THE DRAWINGS

These and/or other aspects of the disclosure should become apparent and more readily appreciated from the following description of embodiments, taken in conjunction with the accompanying drawings of which:

FIG. 3 is a diagram schematically illustrating a relationship between a vehicle and a speech recognition system according to an embodiment;

FIG. 11 is a diagram illustrating an example of information stored in a memory of a speech recognition system according to an embodiment;

DETAILED DESCRIPTION

Figure 1:
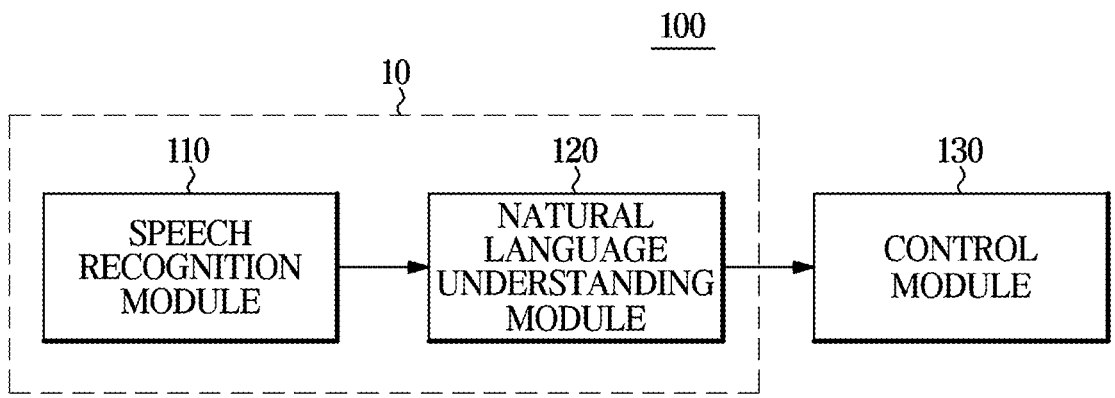
FIG. 1 is a block diagram illustrating a speech recognition system according to an embodiment.

The embodiments set forth herein and illustrated in the configuration of the disclosure are only example embodiments. so it should be understood that they may be replaced with various equivalents and modifications at the time of the disclosure.

Terminologies used herein are for the purpose of describing particular embodiments only and are not intended to limit the disclosure. It should be understood that the singular forms are intended to include the plural forms as well unless the context clearly dictates otherwise. It should be further understood that the terms "include," "comprise," and/or "have," and variations thereof, when used in this specification, specify the presence of stated features, integers, steps, operations, elements, and/or components, but do not preclude the presence or addition of one or more other features, integers, steps, operations, elements, components, and/or groups thereof.

Further, the terms such as "~part," "~device," "~block," "~member," "~module," and the like may refer to a unit for processing at least one function or act. For example, the terms may refer to at least process processed by at least one hardware, such as field-programmable gate array (FPGA)/ application specific integrated circuit (ASIC), software stored in memories, or processors.

It should be understood that, although the terms "first," "second," and the like, may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it is to be understood that the term "at least one of a, b, or c" may include only a, only b, only c, both a and b, both a and c, both b and c, or all of a, b, and c.

Embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Embodiments of a speech recognition system and a method for providing a speech recognition service of the disclosure are described in detail with reference to the accompanying drawings.

FIG. 1 is a block diagram illustrating a speech recognition system according to an embodiment.

Referring to FIG. 1, a speech recognition system 100 according to an embodiment includes a speech processing module 10 extracting information, required to perform a control intended by a user, from a voice signal of a user, and includes a control module 130 generating a control signal for performing the control intended by the user.

The speech processing module 10 may include a speech recognition module 110 converting a user's speech into text and a natural language understanding module 120 determining a user intention corresponding to the user's speech.

The speech recognition module 110 may be implemented with a speech to text (STT) engine and perform conversion into text by applying a speech recognition algorithm to the user's speech.

For example, the speech recognition module 110 may extract feature vectors from a user's speech by applying a feature vector extraction method such as a cepstrum, a linear predictive coefficient (LPC), a Mel frequency cepstral coefficient (MFCC), a filter bank energy, or the like.

A recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

The speech recognition module 110 may convert the user's speech into the text based on learning where deep learning or machine learning is applied. According to an embodiment, a way of converting the user's speech into the text by the speech recognition module 110 is not limited thereto, and a variety of speech recognition techniques may be applied to convert the user's speech into the text.

The natural language understanding module 120 may apply a natural language understanding (NLU) technique to determine user intention included in the input text. Accordingly, the natural language understanding module 120 may include an NLU engine that determines the user intention by applying the NLU technique to an input text. The text output by the speech recognition module 110 may be a sentence input to the natural language understanding module 120.

For instance, the natural language understanding module 120 may recognize an entity name from the input text. The entity name is a proper noun such as a name of an individual person, place, organization, time, day, currency, and the like. Named-entity recognition is for identifying an entity name in a sentence and classifying a type of the identified entity. A keyword may be extracted from a sentence through named-entity recognition to understand the meaning of the sentence.

The natural language understanding module 120 may determine a domain from the input sentence. The domain may be for identifying a subject of the user's speech. For example, domains representing various subjects such as a vehicle control, schedule, information about weather or traffic conditions, text transmission, navigation, and the like, may be determined based on the input sentence.

In addition, the natural language understanding module 120 may analyze a speech act of the input text. Speech act analysis is for analyzing an intention of speech, such as whether the user asks a question, makes a request, responds, or simply expresses the user's emotions.

The natural language understanding module 120 may determine an intent and an entity required to perform the intent, based on the domain, entity name, speech act extracted from the input text. For example, when the input text is "turn on the air conditioner," the domain may be [vehicle control] and the intent may be [turn on, air conditioner]. Here, [turn on] may be an action, [air conditioner] may be a target, and the entity required to perform control corresponding to such intent may be [temperature, air volume].

The control module 130 may output a processing result signal to a user terminal or an external server to provide a service corresponding to a user intention. For example, the control module 130 may generate and output a control signal for performing a control corresponding to an intent extracted from a user's speech.

A user terminal may serve as a gateway between the user and the speech recognition system 100. The user terminal may be a mobile device provided with an input/output interface such as a microphone, a speaker, a display, and the like, or be a vehicle itself. When the user terminal is a mobile device, the vehicle and the mobile device may be connected to each other through a wireless communication such as Bluetooth™, or through a cable connection.

For example, when a service corresponding to a user intention is a vehicle-related control, the control module 130 may generate a control signal for performing the corresponding control and transmit the control signal to the user terminal.

Alternatively, when a service corresponding to a user intention is provision of specific information, the control module 130 may search for the specific information and transmit the retrieved information to the user terminal. Information retrieval may be performed by an external server, when required.

Alternatively, when a service corresponding to the user intention is provision of specific content, the control module 130 may request to an external server providing the corresponding content.

Alternatively, when a service corresponding to the user intention is simply continuation of a dialogue, the control module 130 may generate a response to a user's speech and output the response by voice.

The above-described speech recognition system 100 may be implemented with at least one memory storing a program performing the aforementioned operations and at least one processor implementing a stored program.

The constituent components of the speech recognition system 100 illustrated in FIG. 1 are divided based on their operation or function, and all or a portion of the constituent components may share the memory or processor. In other words, the speech recognition module 110, the natural language understanding module 120, and the control module 130 are not necessarily physically separated from each other.

Figure 2:
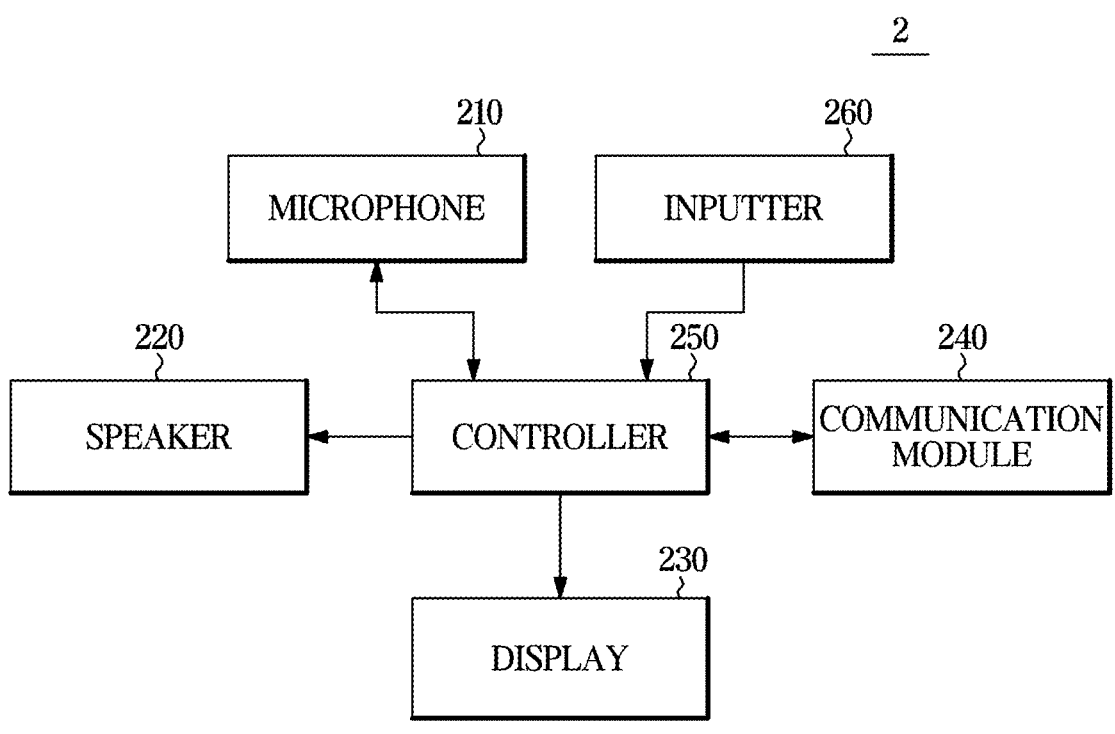
FIG. 2 is a block diagram illustrating a vehicle connected to a speech recognition system according to an embodiment.
Figure 3:
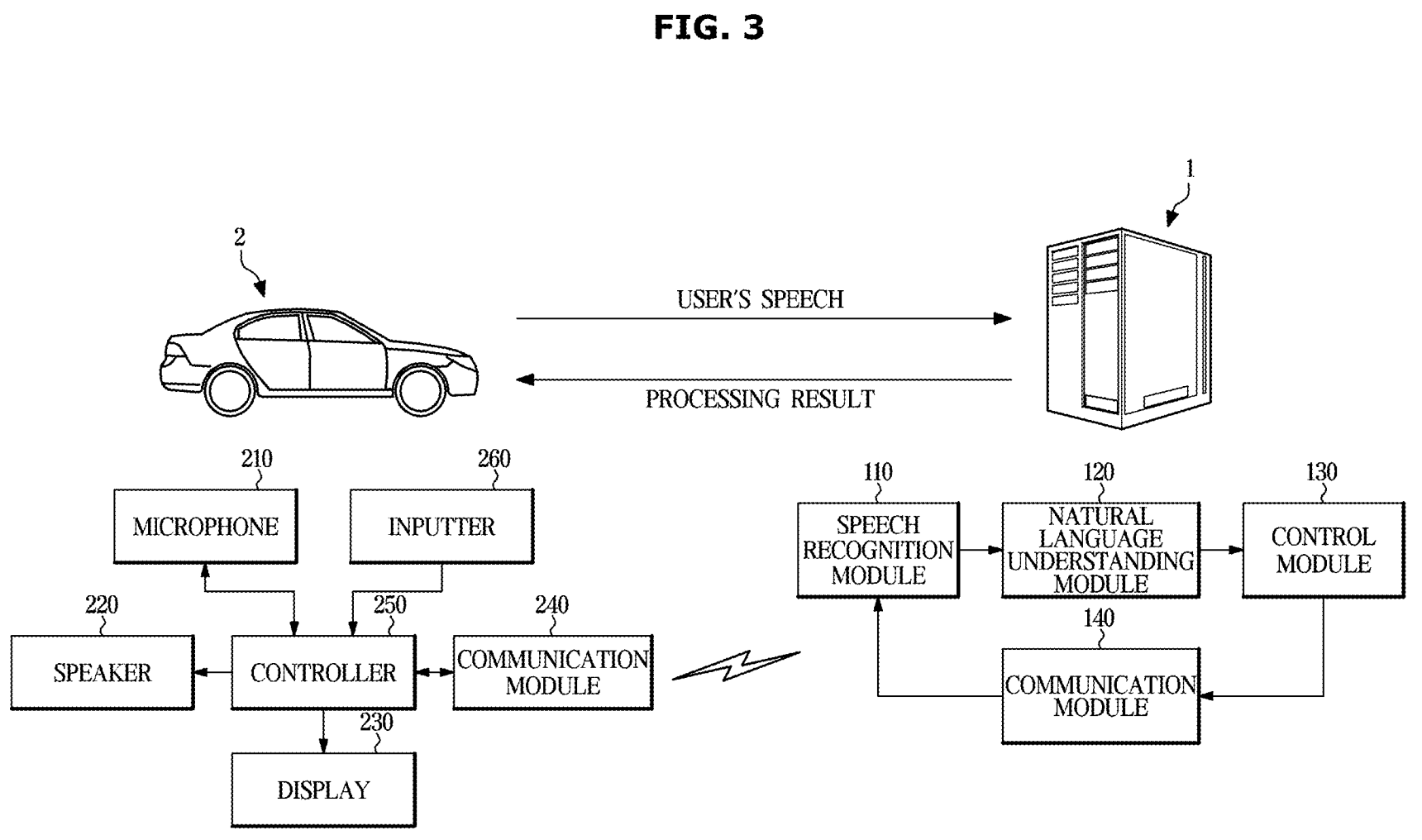

FIG. 2 is a block diagram illustrating a vehicle connected to a speech recognition system according to an embodiment. FIG. 3 is a diagram schematically illustrating a relationship between a vehicle and a speech recognition system according to an embodiment.

Referring to FIG. 2, a vehicle 2 includes a microphone 210 to which a user's speech is input, a speaker 220 outputting sound required to provide a service desired by a user, a display 230 displaying an image required to provide a service desired by the user, a communication module 240 performing communication with an external device, and a controller 250 controlling the above-described constituent components and other constituent components of the vehicle 2.

The microphone 210 may be provided inside the vehicle 2 to receive a user's speech. The user may be a driver or an occupant. The microphone 210 may be provided on a steering wheel, a center fascia, a headliner, or a rear-view mirror, and the like, to receive a speech from the driver or a front occupant.

Two or more microphones 210 may be provided to receive a rear occupant's speech. The microphone 210 for receiving the rear occupant's speech may be provided on a front armrest, a rear armrest, rear doors, B pillar, or C pillar.

The above positions of the microphone 210 are only an example applicable to an embodiment of the vehicle 2. The microphone 210 may be provided anywhere, as long as it may receive a speech from users in each location.

The vehicle 2 may also include an inputter 260 for manually receiving a user command in addition to the microphone 210. The inputter 260 may include an inputter in an area where an audio, video, navigation (AVN) is provided on a center fascia, an inputter in an area where a gearbox is provided, or an inputter provided as a jog shuttle or a button on a steering wheel.

To receive a control command related to passenger seats, the inputter 260 may include an inputter provided on each door of the vehicle 2, and an inputter provided on a front armrest or a rear armrest.

Further, the inputter 260 may include a touchpad like a touchscreen by being provided integrally with the display 230.

The display 230 may include an AVN display provided on a center fascia of the vehicle 2, a cluster display, or a head-up display (HUD). Alternatively, the display 230 may include a rear seat display provided on a back of the front seat's headrest so that a rear occupant may see the rear seat display. When the vehicle 2 is a multi-seater vehicle, the display 230 may include a display mounted on a headliner of the vehicle 2.

The display 230 may be provided anywhere as long as users inside the vehicle 2 may see the display 230, and the position or the number of displays 230 are not limited.

The communication module 240 may transmit and receive information with other devices by using at least one of various wireless communication methods such as Bluetooth™, fourth generation wireless (4G), fifth generation wireless (5G), wireless fidelity (Wi-Fi), and the like. Alternatively, the communication module 240 may transmit and receive information with other devices through a cable connected to a universal serial bus (USB) terminal, an auxiliary port (AUX) terminal, and the like.

For example, the communication module 240 may communicate with a mobile device located in the vehicle 2, thereby receiving information (user images, user speech, contact numbers, schedules, and the like) obtained by or stored in the mobile device. Also, the communication module 240 may communicate with a server 1, thereby transmitting a user's speech and receiving a signal required to provide a service desired by the user. In addition, the communication module 240 may transmit and receive a signal with the server 1 through a mobile device connected to the vehicle 2.

Further, the vehicle 2 may include: a navigation device for route guidance; an air conditioning device for adjusting an indoor temperature; a window adjustment device for opening/closing vehicle windows; a seat heating device for heating seats; a seat adjustment device for adjusting a position, height, or angle of a seat; and a lighting device for adjusting an indoor illuminance level.

The aforementioned constituent components are for providing convenience functions related to the vehicle 2, and a portion of the constituent components may be omitted depending on models or options. Also, other constituent components may be further included in the vehicle 2 in addition to the above constituent components.

The controller 250 may turn on or off the microphone 210, process and store a voice input to the microphone 210 and transmit to another device through the communication module 240.

The controller 250 may control the display 230 to display an image and control the speaker 220 to output a sound.

In addition, the controller 250 may perform various controls related to the vehicle 2. For example, the controller 250 may control at least one of: the navigation device; the air conditioning device; the window adjustment device; the seat heating device; the seat adjustment device; or the lighting device, according to a user command input through the inputter 260 or the microphone 210.

The controller 250 may include at least one memory storing a program performing the aforementioned operations or operations to be described later and at least one processor implementing a stored program.

Referring to FIG. 3, the speech recognition system 100 according to an embodiment may be provided in the server 1. Accordingly, a user's speech input to the vehicle 2 may be transmitted to a communication module 140 of the server 1. When a voice signal is processed by the speech recognition system 100 provided in the server 1, the communication module 140 may transmit a processing result to the vehicle 2 again.

Alternatively, a portion of the constituent components of the speech recognition system 100 according to an embodiment may be provided in the vehicle 2, and the other constituent components may be provided in the server 1.

For example, the speech recognition module 110 may be provided in the vehicle 2. The natural language understanding module 120 and the control module 130 may be provided in the server 1.

As another example, the speech recognition module 110 and the control module 130 may be provided in the vehicle 2 and the natural language understanding module 120 may be provided in the server 1. Alternatively, the speech recognition module 110 and the natural language understanding module 120 may be provided in the server 1 and the control module 130 may be provided in the vehicle 2.

As another example, the speech recognition system 100 may be provided in the vehicle 2.

Although all or a portion of the constituent components of the speech recognition system 100 may be provided in the vehicle 2 as described above, an example where the speech recognition system 100 is provided in the server 1, as shown in FIG. 3, is described in the below-described embodiment.

Figure 4:
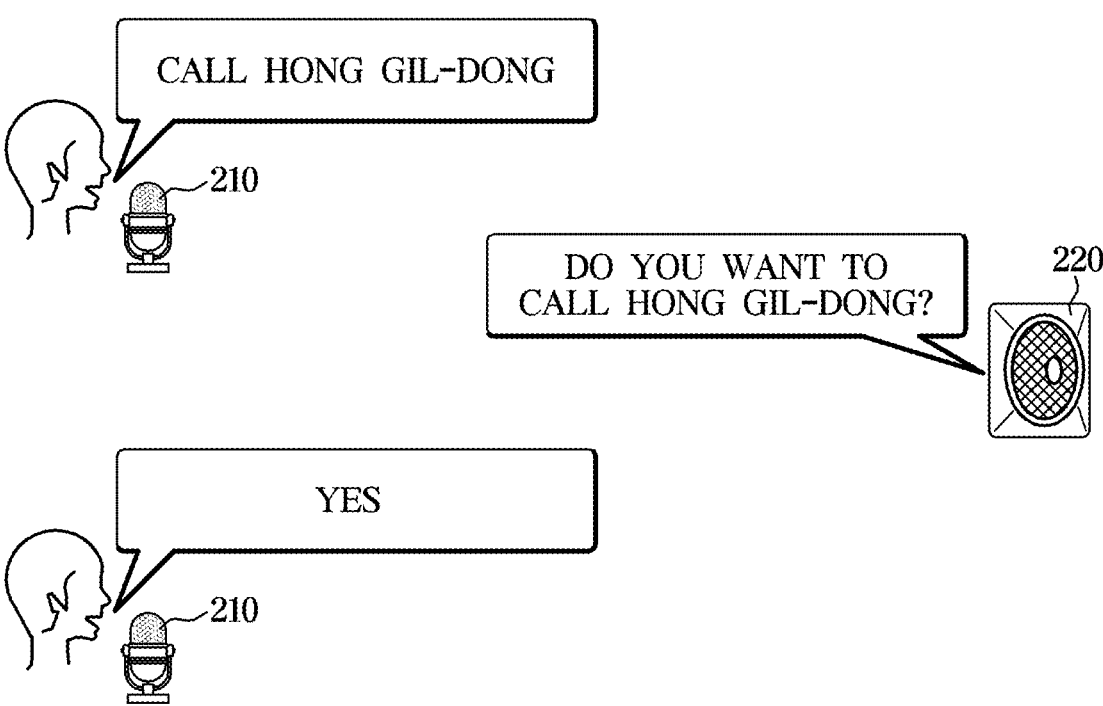
FIGS. 4 and 5 are diagrams illustrating processes of providing a user of a vehicle with a desired service through a speech recognition system according to an embodiment.
Figure 5:
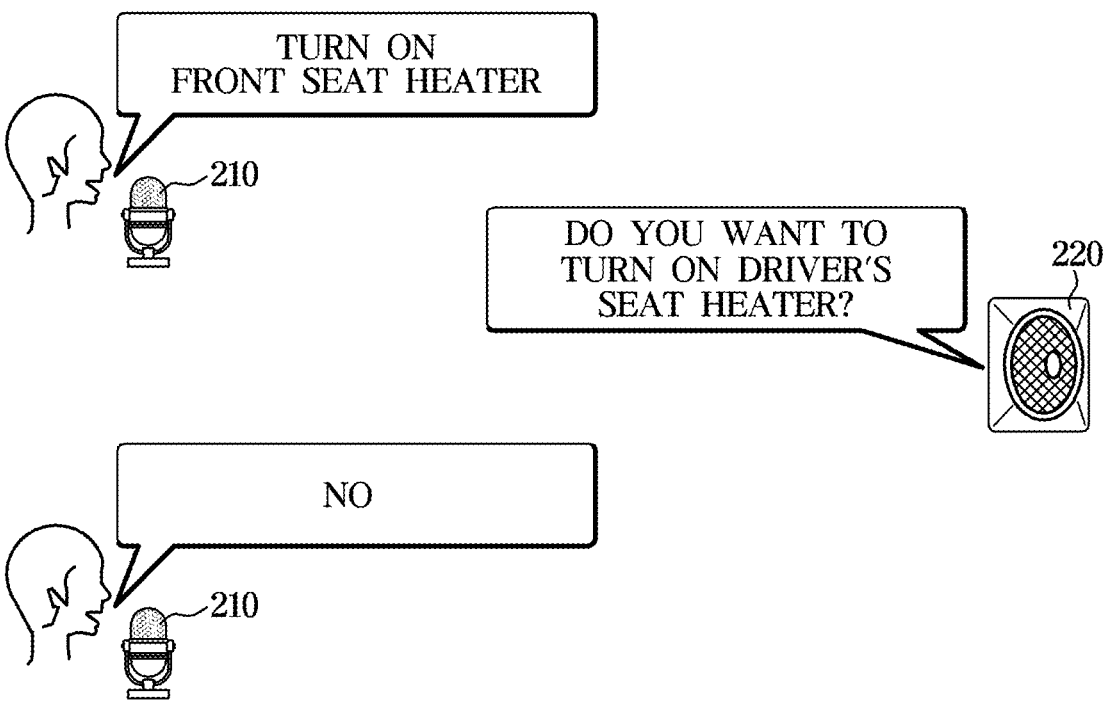

FIGS. 4 and 5 are diagrams illustrating processes of providing a user of a vehicle with a desired service through a speech recognition system according to an embodiment.

When a control intended by a user is "making a call to HONG GIL-DONG", a user's speech like "call HONG GIL-DONG" may be input to the microphone 210, as shown in FIG. 4.

The input user's speech is transmitted to the speech recognition system 100. The speech recognition system 100 that extracts an intent [call] and an entity [HONG GIL-DONG] from the user's speech may check whether a control corresponding to the extracted intent is what is intended by the user, before performing the corresponding control.

For example, the control module 130 may generate a system response for checking, transmit to the vehicle 2, and output the system response like "do you want to make a call to HONG GIL-DONG?" through the speaker 220 of the vehicle 2.

The user hearing the output system response may confirm whether the speech recognition system 100 correctly identifies the user intention. When content of control included in the system response is what the user intends to do, a user's positive speech like "yes" or "ok" may be input.

Alternatively, when a control intended by a user is "turning on a front seat heater," a user's speech like "turn on a front seat heater" may be input to the microphone 210, as shown in FIG. 5.

The input user's speech is transmitted to the speech recognition system 100, and the speech recognition system 100 that extracts an intent [turn on, seat heater] and an entity [front seat] from the user's speech may check whether a control corresponding to the extracted intent is what is intended by the user, before performing the corresponding control.

For example, the control module 130 may generate a system response for checking whether the user intention is to turn on a seat heater of a driver's seat or a front passenger seat, or to turn on both the driver's seat and the front passenger seat and transmit to the vehicle 2. Also, according to the example of FIG. 5, the vehicle 2 may output a system response like "do you want to turn on the driver's seat heater?" through the speaker 220 of the vehicle 2.

The user, hearing the response of the output system, may confirm whether the speech recognition system 100 correctly identifies the user intention. When content of control included in the system response is what the user intends to do, a user's positive speech like "yes" or "ok" may be input. However, when the content of control included in the system response is not what the user intends to do, a user's negative speech shown in FIG. 5 may be input.

In order for the user to be provided with a desired service, dialogues two or more times are usually needed. In particular, as shown in FIGS. 4 and 5, a simple command like "yes" or "no" is repeatedly input.

Even though the speech recognition system 100 is for user convenience, repeated dialogues to specify a control object or content of control may cause user inconvenience.

Accordingly, the speech recognition system 100 according to an embodiment may replace an utterance for command with a simple action of tapping a nearby object, thereby improving utility of the speech recognition system 100. Hereinafter, operations related thereto are described in detail.

Figure 6:
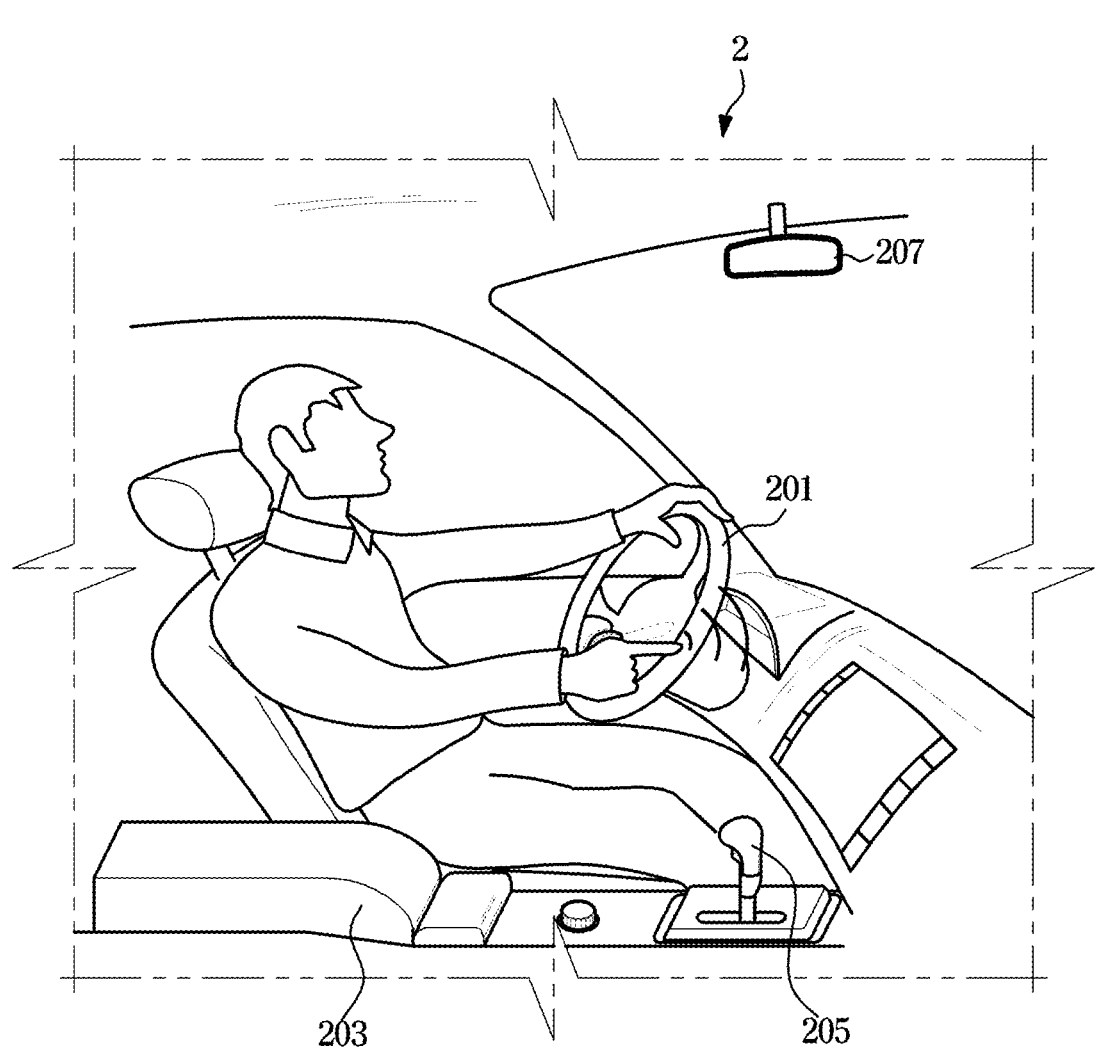
FIGS. 6 and 7 are diagrams illustrating examples of inputting a tap signal by a user of a speech recognition system according to an embodiment.
Figure 7:
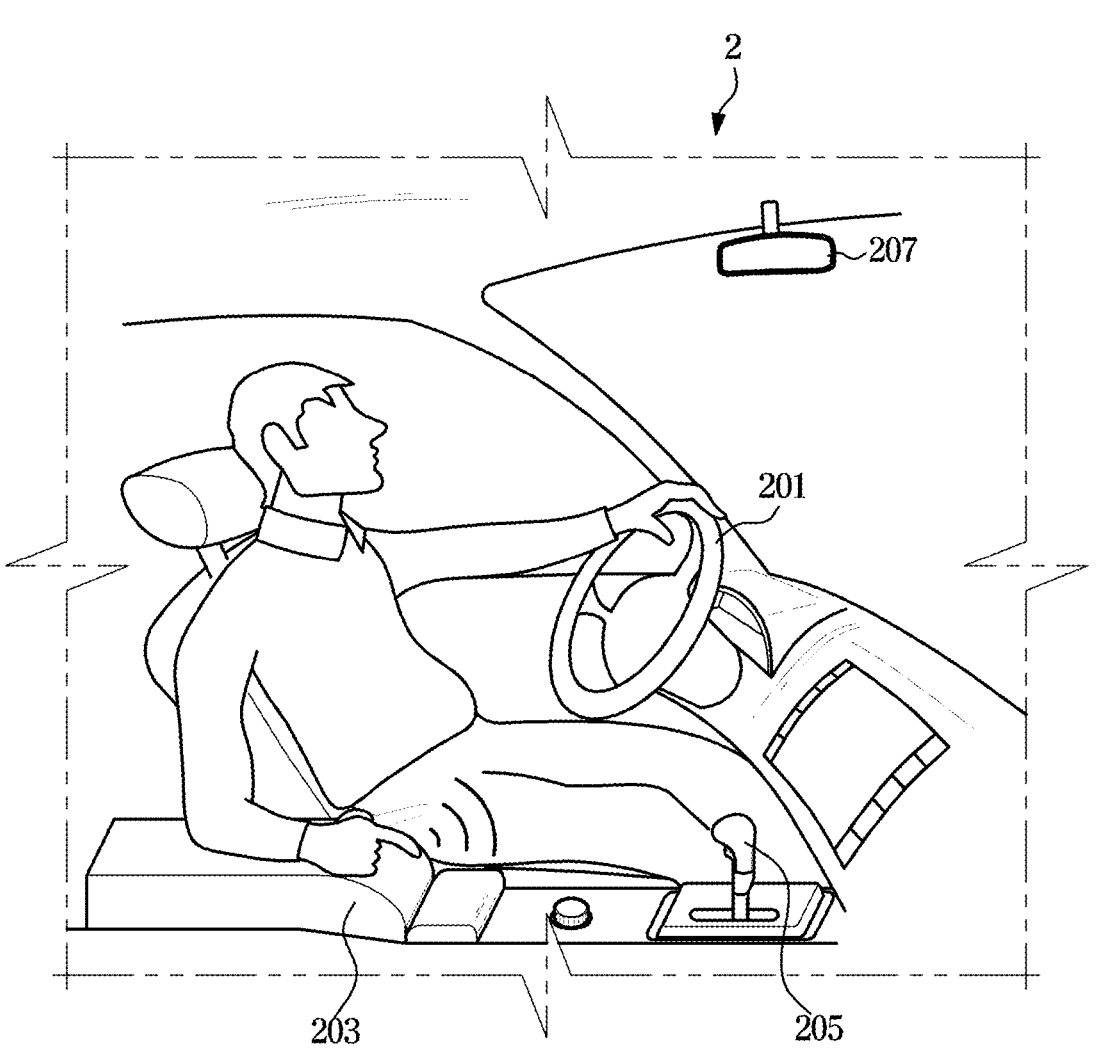

FIGS. 6 and 7 are diagrams illustrating examples of inputting a tap signal by a user of a speech recognition system according to an embodiment.

As shown in FIG. 6, when a user is a driver, the user's hands are usually located on a steering wheel 201. Accordingly, even though the vehicle 2 is travelling, the user may easily tap the steering wheel 201.

Alternatively, as shown in FIG. 7, depending on a user's driving habit, a user may drive a vehicle with an arm placed on an armrest 203 (or a center console) between a driver's seat and a passenger seat. In this case, the user may easily tap the armrest 203.

In addition to the above, depending on a user's driving habit, a user may drive with the hand placed on a shift lever 205, an interior door handle, and the like, or with the hand placed on a part of the user's body, other than constituent components of the vehicle 2. The above-described nearby objects may correspond to an object located to be easily tapped by the user while the vehicle 2 is travelling.

According to an embodiment, the speech recognition system 100 may recognize a tap signal, generated by tapping a nearby object by the user, as a user command. In other words, when a previously registered tap signal is input to the microphone 210, the speech recognition system 100 may perform control according to the user command corresponding to the input tap signal.

Figure 8:
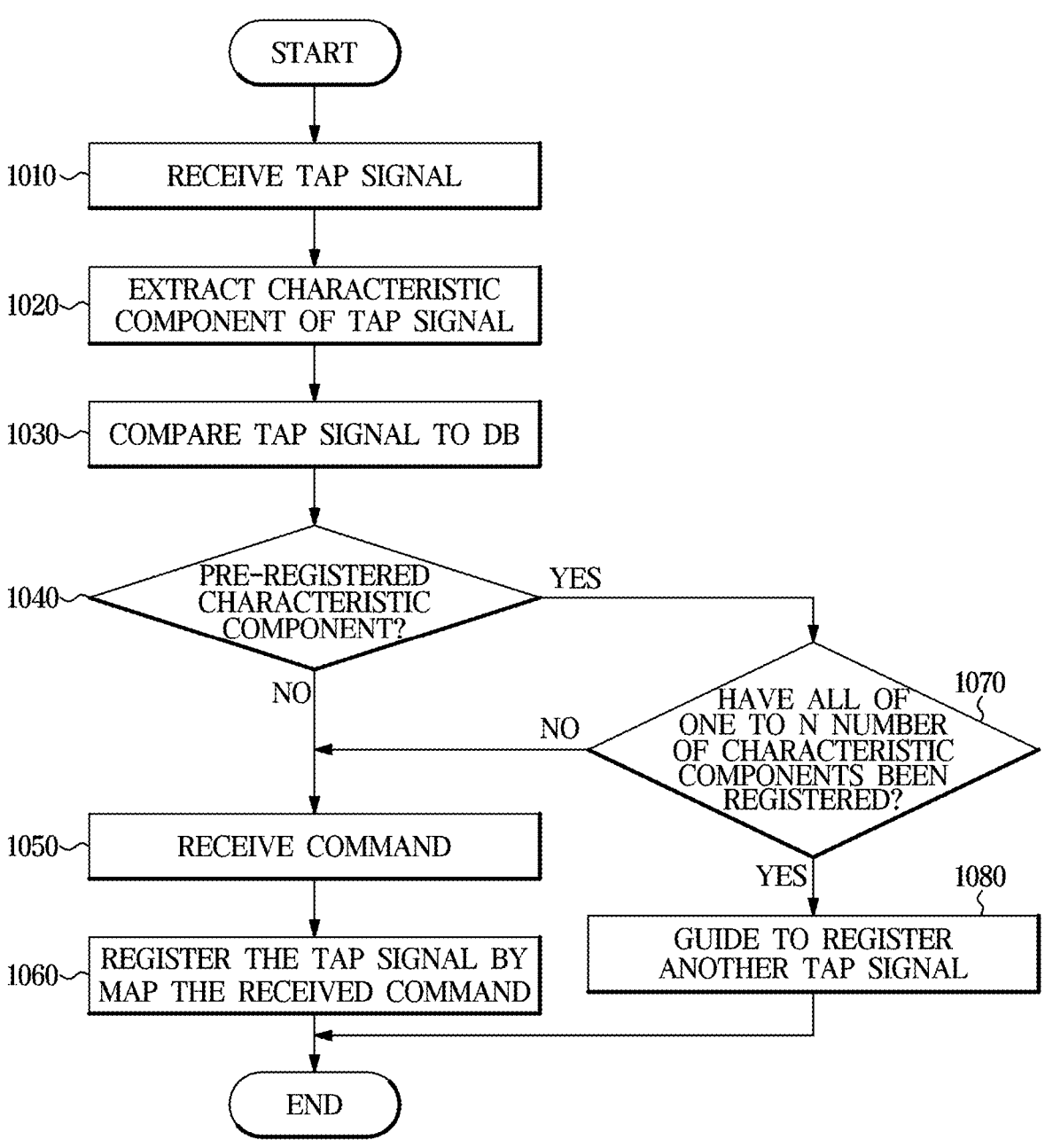
FIG. 8 is a flowchart illustrating operations of registering a tap signal in a method for providing a speech recognition service according to an embodiment.
Figure 9:
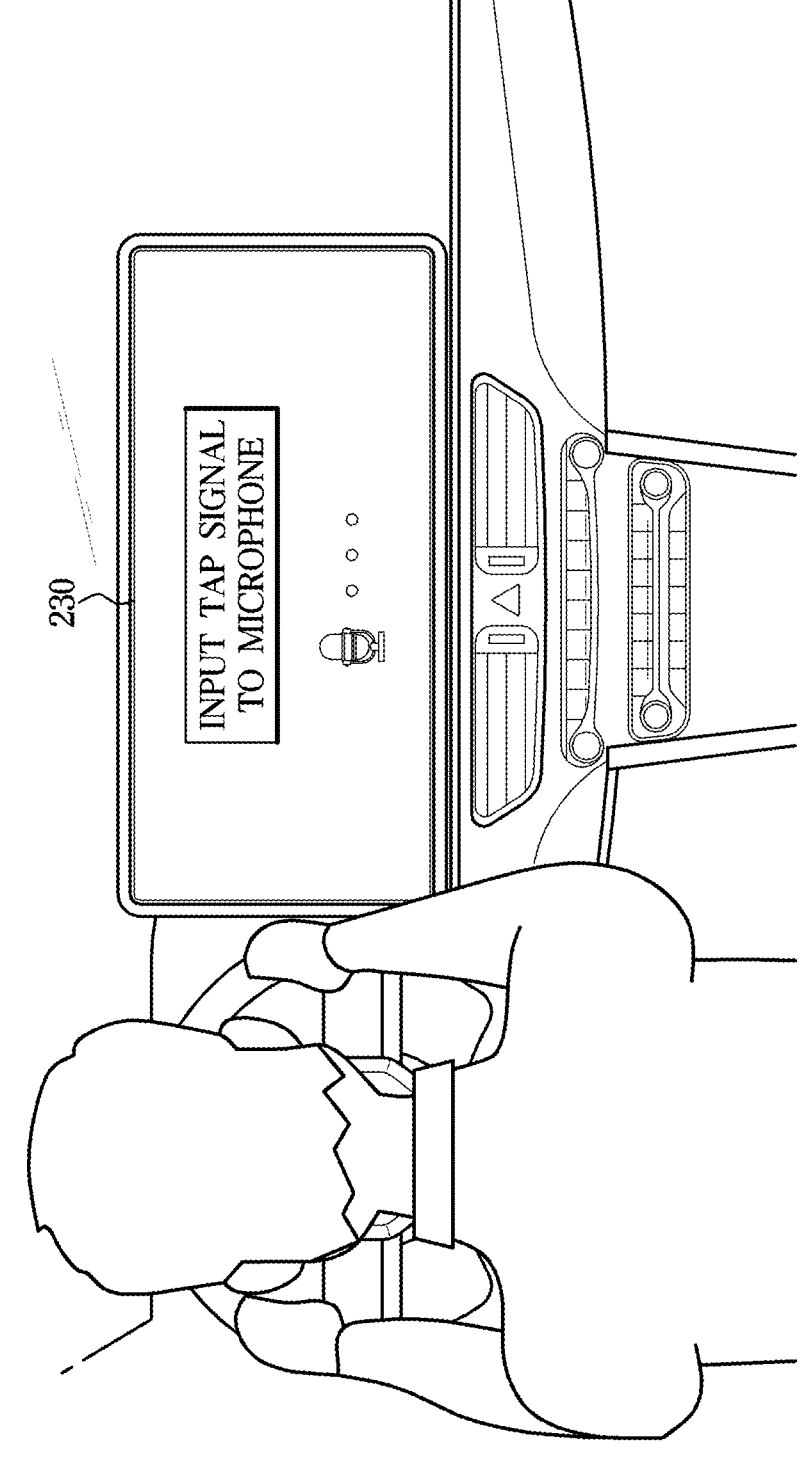
FIG. 9 is a diagram illustrating an example of a screen displayed on a display of a vehicle for registering a tap signal in a method for providing a speech recognition service according to an embodiment.
Figure 10:
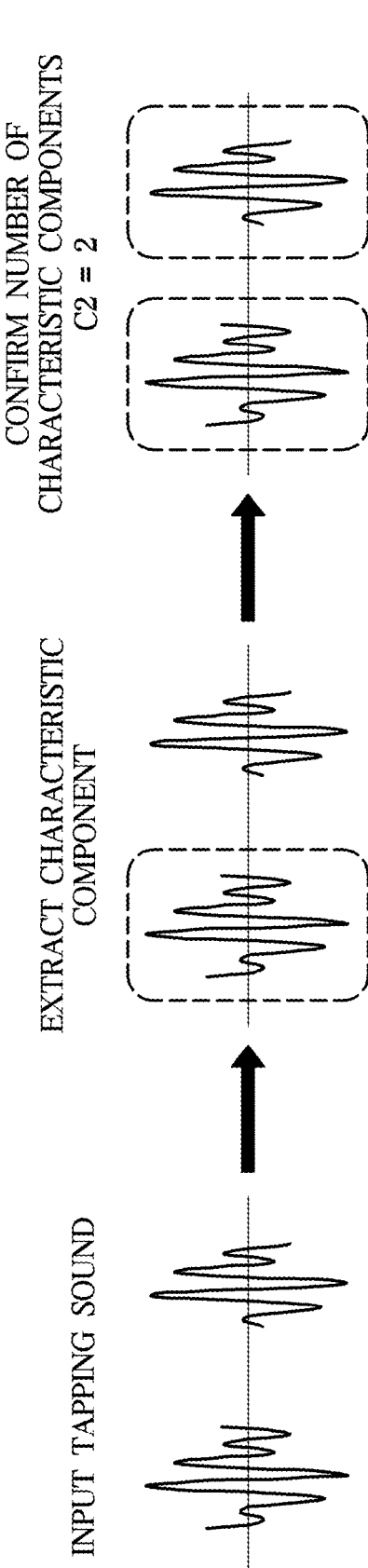
FIG. 10 is a diagram illustrating an example of a characteristic component extracted from a tap signal.

FIG. 8 is a flowchart illustrating operations of registering a tap signal, in a method for providing a speech recognition service according to an embodiment. FIG. 9 is a diagram illustrating an example of a screen displayed on a display of a vehicle for registering a tap signal, in a method for providing a speech recognition service according to an embodiment. FIG. 10 is a diagram illustrating an example of a characteristic component extracted from a tap signal. FIG. 11 is a diagram illustrating an example of information stored in a memory of a speech recognition system according to an embodiment.

The method for providing a speech recognition service according to an embodiment may be performed by the vehicle 2, or the speech recognition system 100. Also, a portion of the method for providing a speech recognition service according to an embodiment may be performed by the vehicle 2 and the other portion of the method for providing a speech recognition service according to an embodiment may be performed by the speech recognition system 100.

Referring to FIG. 8, first, a tap signal input by a user is received to register the tap signal (1010).

To register the tap signal, the user may select a tap signal registration mode through the inputter 260 provided in the vehicle 2. When the tap signal registration mode is selected, as shown in FIG. 9, guide information for requesting for input of a desired tap signal may be visually output on the display 230.

The controller 250 may control the display 230 to output the above-described guide information and turn on the microphone 210. Although the guide information is visually displayed on an audio, video, navigation (AVN) display in the example of FIG. 9, embodiments of the disclosure are not limited thereto. The guide information may be displayed on a head-up display (HUD), a cluster display, or audibly output through the speaker 220.

The user may input a tap signal by tapping a nearby object. The nearby object around the user may be a constituent component of the vehicle 2, or a part of the user's body. For example, the tap signal may be generated by tapping a steering wheel, an armrest, an interior door handle, a shift lever, and the like, or by tapping a thigh of the user.

The input tap signal may be transmitted to the speech recognition system 100. For example, the input tap signal may be transmitted by the communication module 240 of the vehicle 2 and received by the communication module 140 of the server 1.

The control module 130 of the speech recognition system 100 may extract a characteristic component of the received tap signal (1020).

As shown in FIG. 10, the tap signal generated by tapping the nearby object has a waveform in which a characteristic component is repeated according to the number of times that the nearby object is tapped. Accordingly, the tap signal may be defined by a characteristic component C1 and the number of characteristic components C2 included in the tap signal.

The characteristic component C1 of the tap signal may vary depending on what object is tapped, a way of tapping, or a tapping strength. Also, the number of characteristic components C2 included in the tap signal may vary depending on the number of times that the nearby object is tapped. Accordingly, the user may input a different tap signal by changing at least one of a type of the object tapped or the number of taps.

When the characteristic component of the tap signal is extracted, the extracted characteristic component may be compared to tap signal database (1030).

Referring to FIG. 11, a command may be mapped for each tap signal and stored in a memory of the speech recognition system 100 to implement the tap signal database. The command mapped to each tap signal may refer to a command to be executed when a corresponding tap signal is input.

As described above, the tap signal may be defined by the characteristic component C1 and the number of characteristic components C2 included in the tap signal. When each tap signal with the same characteristic component C1 has a different number of characteristic components C2, the tap signal may be registered as a different tap signal. Accordingly, even for a single characteristic component C1, when the number of characteristic components C2 are different, a plurality of commands may be mapped and registered.

The control module 130 may compare the characteristic component C1 of the input tap signal to the tap signal database, thereby determining whether the characteristic component C1 is a pre-registered characteristic component (1040).

When the characteristic component C1 is a pre-registered characteristic component (Yes in operation 1040), it is determined whether all of one to the N number of characteristic components have been registered (1070). The N is an integer greater than or equal to 2 and represents a threshold number of characteristic components included in a single tap signal.

When not all of one to the N number of characteristic components have been registered (No in operation 1070), a command to be mapped to the input tap signal is received (1050).

Figure 12:
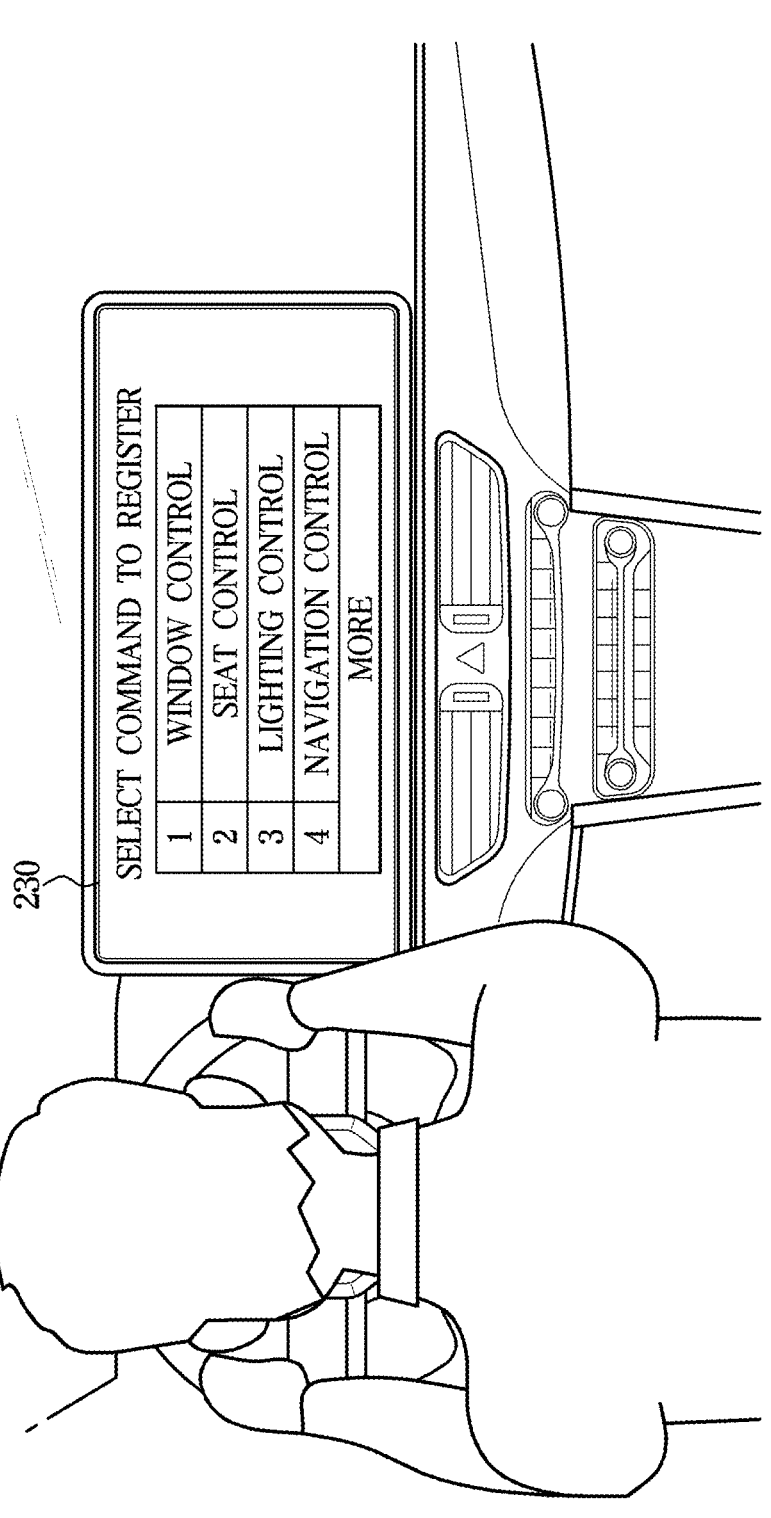
FIGS. 12, 13 and 14 are diagrams illustrating examples of screen displayed on a display of a vehicle for registering a tap signal in a method for providing a speech recognition service according to an embodiment.

To this end, as shown in FIG. 12, information for guiding a selection of command may be visually output on the display 230 of the vehicle 2. The user may select a command such as a window control, seat control, lighting control, navigation control, and the like, by referring to a screen displayed on the display 230. In other words, a command related to a complicated control as well as a simple command which is a response to a system utterance, such as "yes" or "no," may be mapped to the tap signal and stored.

As shown in FIG. 12, the information for guiding a selection of command may be displayed without a pre-registered command, or together with the pre-registered command to enable a tap signal mapped to the pre-registered command to be changed.

The user may select a desired command by voice or through a manual input, and the selected command may be transmitted to the speech recognition system 100.

The control module 130 may register the tap signal by mapping the received command (1060).

In this instance, regardless of the number of characteristic components included in the input tap signal (i.e., regardless of the number of times that the user taps the nearby object), the control module 130 may determine the number of characteristic components of the tap signal to be registered, according to the tap signal registered in the tap signal database.

For example, when a characteristic component of an input tap signal has already been registered in the tap signal database, the control module 130 may register the tap signal in the minimum registerable number. According to the example of FIG. 11, when a tap signal having a characteristic component of the input tap signal has already been registered and the already registered tap signal has a single characteristic component (C2=1), it is possible to newly register from a tap signal including two characteristic components, identical to the above characteristic component, to a tap signal including the N number of characteristic components.

The smaller the number of taps on the nearby object, the easier it is for the user to input. Accordingly, the control module 130 according to an embodiment may newly register a tap signal including two characteristic components, which is the minimum number among the registerable numbers.

The speech recognition system 100 may provide the user with information about the tap signal to be registered. For example, as shown in FIG. 13, guide information notifying that it is registered as 'tapping twice' may visually output on the display 230.

Figure 13:
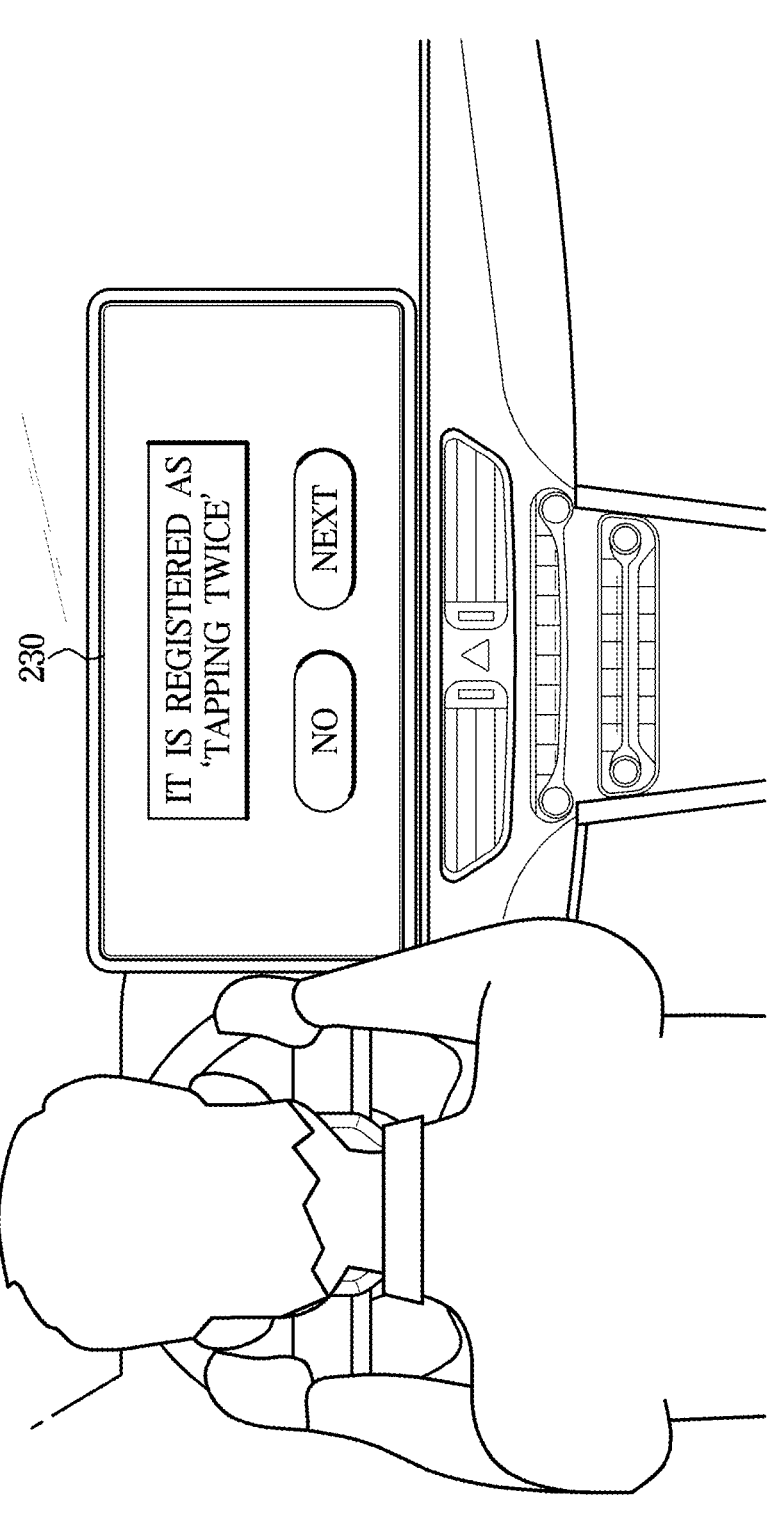

Although it is in the example of FIG. 13 illustrated that the guide information is visually displayed on an AVN display, embodiments of the disclosure are not limited thereto. The guide information may be displayed on a head-up display, a cluster display, or audibly output through the speaker 220.

The user may end registration by selecting a 'next' button displayed on the display 230 or change the number of taps by selecting a 'no' button.

Referring again to FIG. 8, when all of one to the N number of characteristic components of the input tap signal have been registered (Yes in operation 1070), a guide may be made to register another tap signal (1080).

For the characteristic component of the input tap signal, a command may no longer be additionally registered. Accordingly, as shown in FIG. 14, guide information requesting that another tap signal is to be input may be output on the display 230.

Figure 14:
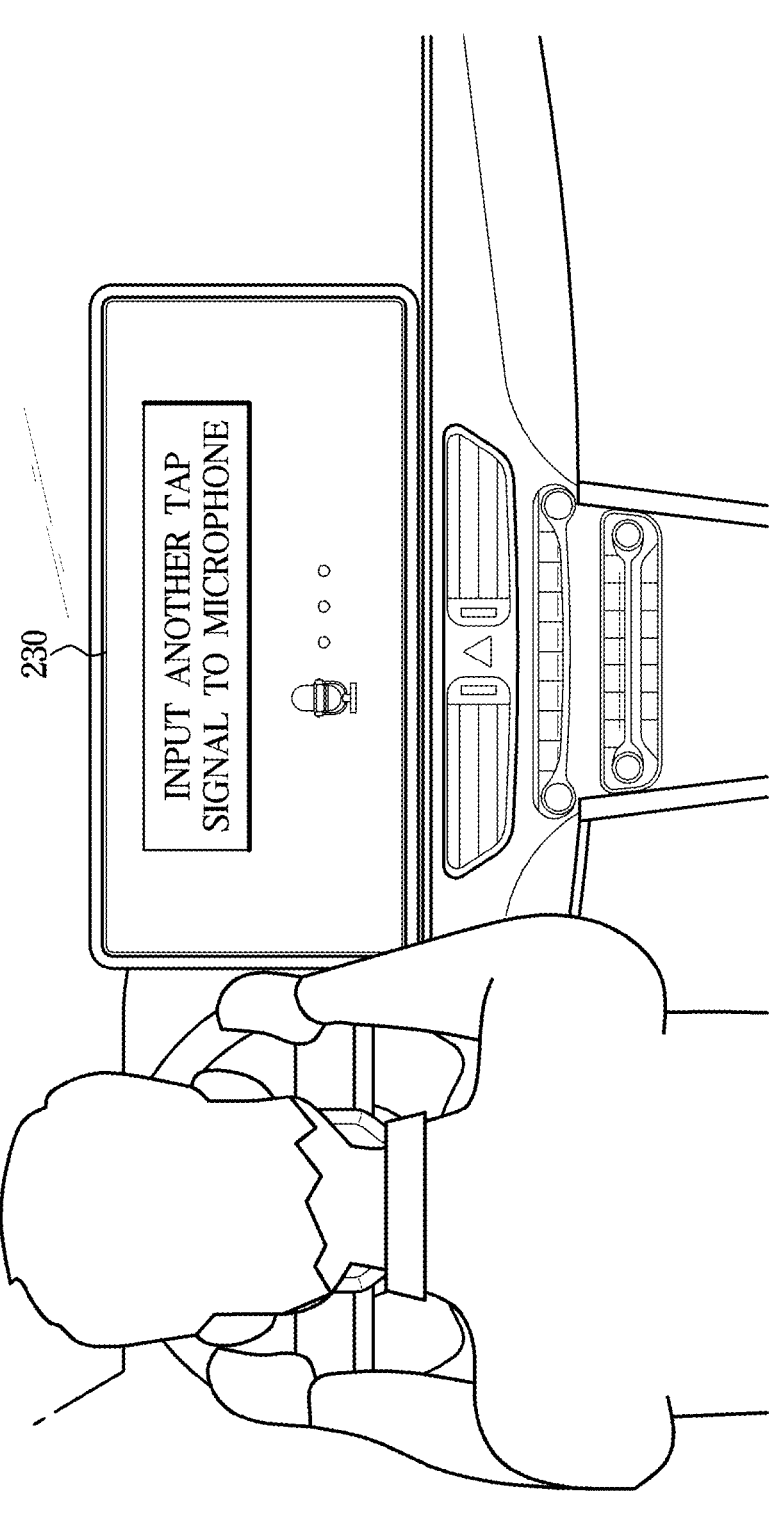

Although it is in the example of FIG. 14 illustrated that the guide information is visually displayed on an AVN display, embodiments of the disclosure are not limited thereto. The guide information may be displayed on a head-up display or a cluster display, or audibly output through the speaker 220.

Figure 15:
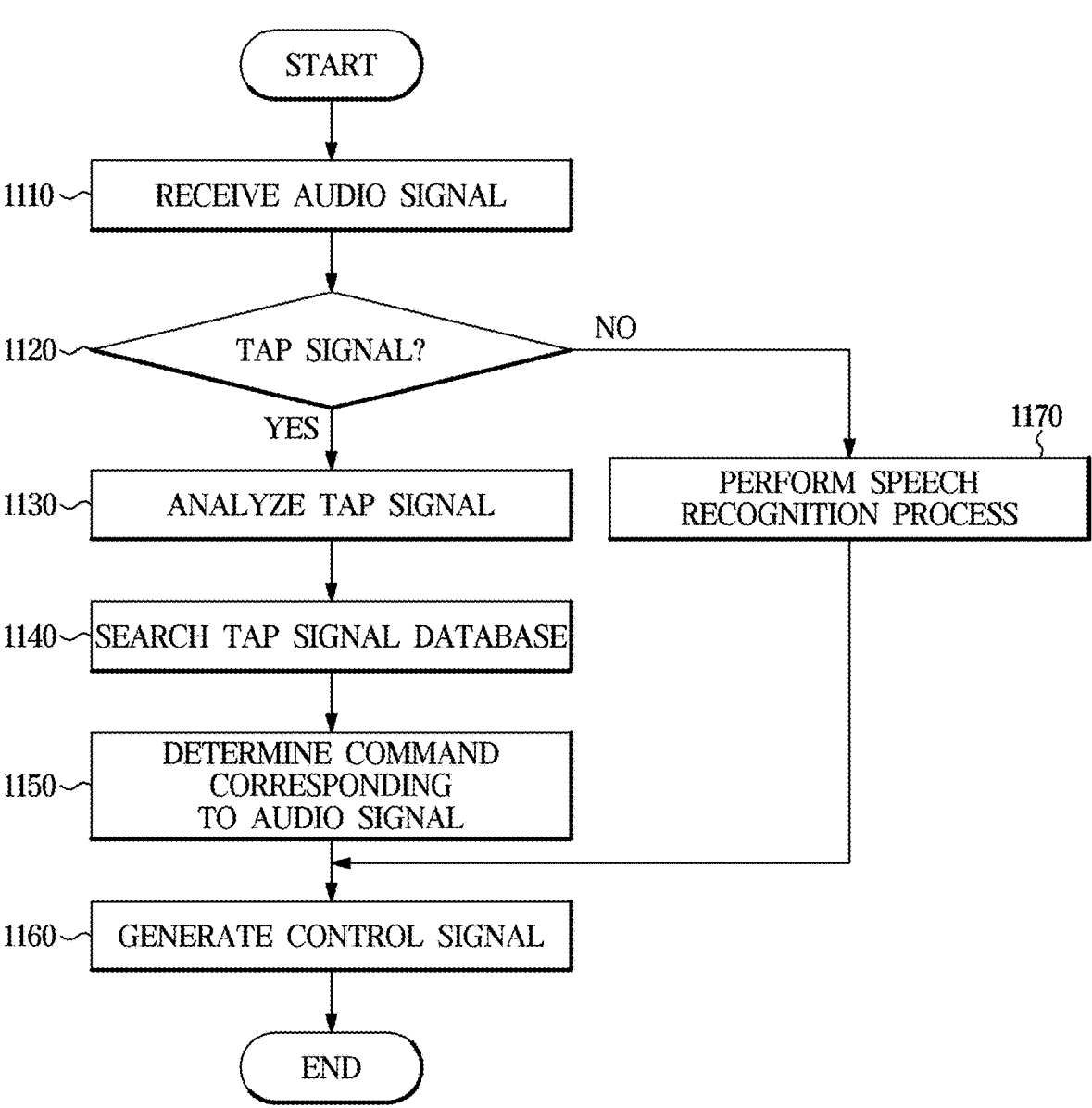
FIG. 15 is a flowchart illustrating operations of receiving a tap signal or a voice signal from a user and performing a control corresponding to a user intention in a method for providing a speech recognition service according to an embodiment.

FIG. 15 is a flowchart illustrating operations of receiving a tap signal or a voice signal from a user and performing a control corresponding to a user intention, in a method for providing a speech recognition service according to an embodiment.

Referring to FIG. 15, the speech recognition system 100 receives an audio signal from a user (1110).

The audio signal is input to the microphone 210 of the vehicle 2 and may include a voice signal of the user and a tap signal generated by tapping a nearby object by the user.

The input audio signal may include a sound generated by nearby occupants or objects, and such sounds may deteriorate a recognition performance of the tap signal.

As described above, a plurality of microphones 210 may be included in the vehicle 2. For example, a driver's side microphone 211 for receiving a speech from a driver and a passenger side microphone 212 for receiving a speech from a front occupant may be provided in an area in which a rear-view mirror 207 is located.

The controller 250 may transmit to the speech recognition system 100, both the audio signal input to the driver's side microphone 211 and the audio signal input to the passenger side microphone 212.

The control module 130 of the speech recognition system 100 may remove a noise, included in the audio signal input to the driver's side microphone 211, by using the audio signal input to the passenger side microphone 212. The audio signal with the noise removed is processed, which is described later.

Through the noise removal, the tap signal input by the user may be separated from the sound generated by the nearby occupant or object, thereby improving a recognition performance of the tap signal. Even when the input audio signal is a voice signal, a voice recognition performance may be improved through the noise removal.

By contrast, when a subject inputting an audio signal is a front occupant, a noise, included in the audio signal input to the passenger side microphone 212, may be removed by using the audio signal input to the driver's side microphone 211.

The subject inputting an audio signal may be determined based on which microphone a wake-up word is input or based on which button of push to talk (PTT) buttons provided in each of the driver's seat and the passenger seat receives an input.

The above-described noise removal may be performed in a same manner in an operation of registering a tap signal.

The tap signal generated by tapping an object has a completely different frequency component from a voice signal input by a user's speech. For example, a voice signal generally consists of two or more words and a wave height is generated for each word, and thus a frequency component of voice signal is complicated. However, only a sound component of a short moment exists in a tapping sound, and thus the tapping sound is easily distinguishable from a voice signal.

Accordingly, when an audio signal is received, the control module 130 may determine whether the received audio signal includes the tap signal or voice signal.

As a result of determination, when the tap signal is included in the input audio signal (Yes in operation 1120), the control module 130 analyzes the tap signal (1130).

As described above, the control module 130 may extract a characteristic component C1 from the tap signal and count how many characteristic components C2 are included in the tap signal.

The control module 130 may search a tap signal database (1140), and determine a command mapped to the input audio signal (1150).

Referring again to the example of FIG. 11, when the input tap signal is a signal having a single characteristic component (C2=1) of a first row, a command mapped to the tap signal and stored is "yes". In other words, a positive response to an output system utterance may be determined as a command mapped to the audio signal.

When the input tap signal is not registered in the tap signal database, the operation of registering a tap signal described with reference to FIG. 8 may be performed or guide information requesting for inputting a tap signal again may be output.

When the command is determined, the control module 130 may generate a control signal for performing the determined command (1160). The generated control signal may be transmitted to the vehicle 2, and the controller 250 of the vehicle 2 may control a constituent component of the vehicle 2 according to the transmitted control signal to provide a service intended by the user.

When a voice signal is included in the input audio signal (No in operation 1120), a speech recognition process may be performed (1170).

The speech recognition process may be performed by the speech recognition module 110 converting the voice signal into text and the natural language understanding module 120 determining a user intention corresponding to the text.

When an intent is extracted through the speech recognition process, the control module 130 may generate a control signal for performing a control corresponding to the extracted intent (1160).

Although it has been described that the speech recognition system 100 is directly connected to the vehicle 2 to exchange signals in the above example, the speech recognition system 100 may be connected to the vehicle 2 through a mobile device of the user. The above-described guide information may be visually or audibly output through the mobile device. The audio signal may also be input through a microphone of the mobile device.

When a control intended by the user is related to a vehicle control, the mobile device may transmit the control signal received from the speech recognition system 100 to the vehicle 2. When a control intended by the user is related to provision of specific information or specific content, the mobile device may transmit a control signal to the vehicle 2 and the specific information or specific content may be output through a speaker or a display of the mobile device.

As should be apparent from the above, according to embodiments of the disclosure, the speech recognition system and the method for providing a speech recognition service can map and register a tap signal, generated by tapping an object around a user of a vehicle, to a specific command, and replace an utterance for the specific command with a simple action of tapping the nearby object, thereby improving user convenience.

Although embodiments have been described for illustrative purposes, those having ordinary skill in the art should appreciate that various modifications, additions and substitutions are possible, without departing from the scope and spirit of the disclosure. Therefore, embodiments have not been described for limiting purposes.

What is claimed is:

1. A speech recognition system comprising:
a processor configured to
    extract information, required to perform a control intended by a user, from a voice signal of the user in a vehicle, and
    generate a control signal for performing the control intended by the user; and
a memory configured to map and store a tap signal and a command corresponding to the tap signal,
wherein, the processor is further configured to
    when the tap signal stored in the memory is included in an audio signal input through a microphone, generate the control signal based on the command corresponding to the tap signal stored in the memory,
    store a tap signal input through the microphone and generate, in a registration mode where the tap signal is stored in the memory and based on a characteristic component of the tap signal input through the microphone being identical to a characteristic component of the tap signal stored in the memory, guide information so that numbers different from a number of characteristic components of the tap signal stored in the memory are registered, generate guide information in the registration mode so that the user inputs another tap signal when the characteristic component of the tap signal input through the microphone is identical to the characteristic component of the tap signal stored in the memory, and when tap signals from a tap signal including a single number of the characteristic component to a tap signal including an N number of the characteristic components are stored in the memory, N being an integer greater than or equal to 2 and representing a threshold number, and output the guide information through a display or a speaker, and register in the registration mode a smallest number among the numbers different from the number of characteristic components of the tap signal stored in the memory when the characteristic component of the tap signal input through the microphone is identical to the characteristic component of the tap signal stored in the memory, and when tap signals from a tap signal including a single number of the characteristic component to a tap signal including an N number of the characteristic components are not stored in the memory.

2. The speech recognition system of claim 1, wherein the tap signal is generated by tapping a nearby object including a constituent component of the vehicle that the user drives or a body part of the user.

3. The speech recognition system of claim 1, wherein the tap signal is defined by the characteristic component of the tap signal and a number of characteristic components included in the tap signal.

4. The speech recognition system of claim 3, wherein the characteristic component of the tap signal varies depending on a type of a nearby object tapped by the user, and wherein the number of characteristic components of the tap signal vary depending on a number of times the user taps the nearby object.

5. The speech recognition system of claim 2, wherein the constituent component of the vehicle includes at least one of a steering wheel, an interior door handle, a shift lever, or an armrest.

6. The speech recognition system of claim 1, wherein the processor is configured to map and store the tap signal input through the microphone to a command selected by the user in the memory, in the registration mode where the tap signal is stored in the memory.

7. The speech recognition system of claim 1, wherein the microphone comprises a driver's side microphone and a passenger side microphone, and wherein the processor is configured to remove a noise of an audio signal input through the driver's side microphone, based on an audio signal input through the passenger side microphone.

8. A method of providing a speech recognition service, the method comprising:

receiving an audio signal input through a microphone located in a vehicle;

determining whether a tap signal or a voice signal is included in the audio signal input;

when the tap signal is included in the audio signal input, determining a command mapped to the tap signal and storing the tap signal and the command in a memory; and generating a control signal for performing a control corresponding to the command mapped to the tap signal, and wherein storing a tap signal input through the microphone comprises in a registration mode where the tap signal is stored and based on a characteristic component of the tap signal input through the microphone being identical to a characteristic component of the tap signal stored in the memory, generating guide information so that numbers different from a number of characteristic components of the tap signal stored in the memory are registered, generating guide information in the registration mode so that a user inputs another tap signal when the characteristic component of the tap signal input through the microphone is identical to the characteristic component of the tap signal stored in the memory, and when tap signals from a tap signal including a single number of the characteristic component to a tap signal including an N number of the characteristic components are stored in the memory, N being an integer greater than or equal to 2 and representing a threshold number, and outputting the guide information through a display or a speaker, and registering in the registration mode a smallest number among the numbers different from the number of characteristic components of the tap signal stored in the memory when the characteristic component of the tap signal input through the microphone is identical to the characteristic component of the tap signal stored in the memory and when tap signals from a tap signal including a single number of the characteristic component to a tap signal including an N number of the characteristic components are not stored in the memory.

9. The method of claim 8, wherein the tap signal generated by tapping a nearby object includes a constituent component of the vehicle that a user drives or a body part of the user.

10. The method of claim 8, wherein the tap signal is defined by a characteristic component of the tap signal and a number of characteristic components included in the tap signal.

11. The method of claim 10, wherein the characteristic component of the tap signal varies depending on a type of a nearby object tapped by a user, and wherein the number of characteristic components of the tap signal vary depending on a number of times the user taps the nearby object.

12. The method of claim 9, wherein the constituent component of the vehicle includes at least one of a steering wheel, an interior door handle, a shift lever, or an armrest.

13. The method of claim 8, further comprising mapping and storing the tap signal input through the microphone to a command selected by a user in a memory, in the registration mode where the tap signal is stored in the memory.

14. The method of claim 8, wherein the microphone comprises a driver's side microphone and a passenger side microphone, and the method further comprises removing a noise of an audio signal input through the driver's side microphone, based on an audio signal input through the passenger side microphone.

* * * * *